United States Patent
Kim

(10) Patent No.: US 8,751,535 B1
(45) Date of Patent: Jun. 10, 2014

(54) SYSTEMS AND METHODS FOR SECURELY STORING, CONTROLLING AND SHARING PERSONAL INFORMATION

(71) Applicant: Hoewon Kim, Seoul (KR)

(72) Inventor: Hoewon Kim, Seoul (KR)

(73) Assignee: Google Inc., Mountain View, GA (US)

( * ) Notice: Subject to any disclaimer, the term of this patent is extended or adjusted under 35 U.S.C. 154(b) by 0 days.

(21) Appl. No.: 13/660,448

(22) Filed: Oct. 25, 2012

Related U.S. Application Data

(60) Provisional application No. 61/714,224, filed on Oct. 16, 2012.

(51) Int. Cl.
*G06F 17/30* (2006.01)
*G06F 3/0482* (2013.01)

(52) U.S. Cl.
CPC .............................. *G06F 17/30029* (2013.01)
USPC .......................................... 707/784; 715/713

(58) Field of Classification Search
None
See application file for complete search history.

(56) References Cited

U.S. PATENT DOCUMENTS

| | | | |
|---|---|---|---|
| 2003/0149580 A1* | 8/2003 | Moores et al. ..................... 705/1 |
| 2007/0282959 A1* | 12/2007 | Stern ............................ 709/206 |
| 2009/0138546 A1* | 5/2009 | Cruzada ........................ 709/203 |
| 2009/0187973 A1* | 7/2009 | Dattathreya et al. .............. 726/4 |
| 2010/0057843 A1* | 3/2010 | Landsman et al. ............ 709/203 |
| 2012/0169583 A1* | 7/2012 | Rippel et al. .................. 345/156 |
| 2013/0013727 A1* | 1/2013 | Walker .......................... 709/217 |

* cited by examiner

*Primary Examiner* — Tarek Chbouki
(74) *Attorney, Agent, or Firm* — Troutman Sanders LLP; James E. Schutz; Mark Lehi Jones

(57) ABSTRACT

Certain implementations of the disclosed technology may include systems, methods, and apparatus for securely storing and sharing personal information. According to an example implementation, a method is provided. The method includes receiving, at a mobile device, user profile information. The method includes storing the received user profile information in a database on the mobile device, where access to the user profile information is controlled by an operating system on the mobile device. The operating system selectively makes the user profile information available to a plurality of applications. The method further includes receiving a request for user information, and in response to the request, accessing the database, selecting at least a subset of stored user profile information in the database to be used to populate one or more fields, and populating the one or more fields with a selected subset of the stored user profile information.

20 Claims, 4 Drawing Sheets

SYSTEMS AND METHODS FOR SECURELY STORING, CONTROLLING AND SHARING PERSONAL INFORMATION

This application is related to provisional application Ser. No. 61/714,224, filed on 16 Oct. 2012, entitled: "SYSTEMS AND METHODS FOR SECURELY STORING, CONTROLLING AND SHARING PERSONAL INFORMATION," the contents of which are hereby incorporated by reference in their entirety.

BACKGROUND

With the proliferation of mobile devices, more and more users interact with websites using mobile devices. A number of websites offer products and services that can be accessed by the mobile device, but most of these websites require the user to enter personal information, such as name, e-mail address, phone number, etc. into his or her mobile browser to access or order the services or products. The typical website requires the users to fill-out forms by manually entering data, which can be a time consuming and inconvenient for them due in part to small screens and keyboards on mobile devices.

SUMMARY

Some or all of the above needs may be addressed by certain implementations of the disclosed technology. Certain implementations may include systems and methods for securely storing personal information on a mobile device. Certain implementations may include systems and methods for securely controlling the transfer or sharing of the personal information.

According to an example implementation, a method is provided. The method includes receiving, at a mobile device, user profile information. The method also includes storing the received user profile information in a database on the mobile device, where access to the user profile information is controlled by an operating system on the mobile device. The operating system selectively makes the user profile information available to a plurality of applications. The method further includes receiving a request for user information, and in response to the request, accessing the database, selecting at least a subset of stored user profile information in the database to be used to populate one or more fields, and populating the one or more fields with a selected subset of the stored user profile information.

According to another example implementation, a system is provided. The system includes a presence sensitive interface, a display, one or more processors in communication with the presence sensitive interface, the display, and at least one memory. The memory is configured for storing an operating system and a database. The memory is configured to be in communication with the one or more processors and is further configured for storing data and instructions that, when executed by the at least one processor under control of the operating system, cause the system to receive user profile information, store the received user profile information in a database, wherein access to the user profile information in the database is controlled by an operating system, and wherein the operating system selectively makes the user profile information available to a plurality of applications associated with the system, receive a request for user information to populate one or more fields, and in response to the request, access the database, select at least a subset of stored user profile information in the database to be used to populate the one or more fields; and populate the one or more fields with a selected subset of the stored user profile information.

According to another example implementation, a computer-readable medium is provided. The computer-readable medium stores instructions which, when executed by at least one processor in a system, cause the system to perform a method. The method includes receiving user profile information. The method also includes storing the received user profile information in a database on the system, where access to the user profile information is controlled by an operating system on the system. The operating system selectively makes the user profile information available to a plurality of applications. The method further includes receiving a request for user information, and in response to the request, accessing the database, selecting at least a subset of stored user profile information in the database to be used to populate one or more fields, and populating the one or more fields with a selected subset of the stored user profile information.

Other implementations, features, and aspects of the disclosed technology are described in detail herein and are considered a part of the claimed disclosed technology. Other implementations, features, and aspects can be understood with reference to the following detailed description, accompanying drawings, and claims.

BRIEF DESCRIPTION OF THE FIGURES

Reference will now be made to the accompanying figures and flow diagrams, which are not necessarily drawn to scale, and wherein.

DETAILED DESCRIPTION

Figure 1:
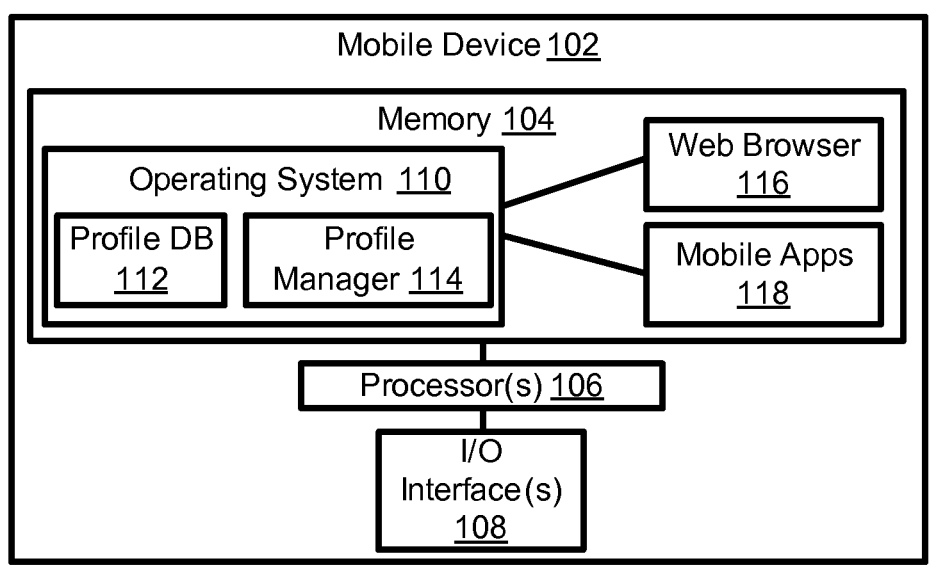
FIG. 1 is a block diagram of an illustrative mobile device 102 according to an example implementation.

In the following description, numerous specific details are set forth. However, it is to be understood that implementations of the disclosed technology may be practiced without these specific details. In other instances, well-known methods, structures and techniques have not been shown in detail in order not to obscure an understanding of this description. References to "one implementation," "an implementation," "example implementation," "various implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

The disclosed technology addresses several aspects of securely controlling and sharing personal information. While the examples disclosed herein relate primarily to securely storing, controlling, and selectively sharing personal information using mobile computing and/or mobile communication devices, similar systems and methods may be utilized on desktop computers and the like without departing from the scope of the disclosed technology.

According to certain embodiments, personal information such as name, address, phone number, e-mail address, social security number, etc., may be stored on a mobile device under control of the mobile device's operating system. In certain implementations, various subsets of the stored personal information may be created and selected for sharing with various entities such as local applications, remote applications, web browsers, 3rd party applications, remote servers, etc. For example, in one implementation, the user may create multiple versions of data sets for sharing with 3rd parties. For example, a limited information data set that only includes first name, last name, and e-mail address may be pre-prepared and selected as needed for use with populating certain web forms. According to an example implementation of the disclosed technology, another data set may include additional user information such as a phone number. Yet another version of the data set may include all available personal information including date of birth, social security number, password, etc. Depending on the personal information request and the level of trust, the appropriate personal information data set can be selected by the user for sharing with the requesting application, website, 3rd party, remote server, etc. Example implementations may store information in XML. Example implementation may utilize JavaScript to parse the information as required based on the requesting entity. According to certain example implementation, a user may opt-in to allow certain personal information to be stored on the mobile device. In another example implementation, the user may opt-out to keep their personal information from being stored on the mobile device. According to certain implementations, the user may selectively control which personal information is stored on the mobile device.

In certain implementations, the various subsets of personal information may contain respective levels of sensitive information, so that for example, an appropriate amount of information may be selected and shared for a given situation and/or trust level. For example, when placing an online order for a product or service, it may be necessary to enter credit card account information in a field. In other examples a social security number or password may be required. In yet another example, an e-mail address may be required for signing up for an electronic newsletter, but it may be unnecessary (or even non-secure) to provide a social security number for this situation. According to example implementations of the disclosed technology, a subset of personal information may be selected by the user for automatically populating a form.

In one embodiment, personal information may be stored in a mobile device's database under the control of the mobile device's operating system. According to one implementation, populating the database with information and/or providing the information to an external server may be handled by a profile manager associated with the operating system, rather than by a browser installed on the mobile device. In certain implementations of the disclosed technology, the security of the personal information may be enhanced by placing access to the stored information under the control of the operating system.

According to implementations of the disclosed technology, initially populating the mobile device's local database with personal information may be accomplished several ways. For example, one data entry method may include manual entry of data into predefined fields (first name, last name, address, etc.,) as part of setup of a new mobile device. In such an implementation, messages may be generated by the profile manager under the control of the operating system and displayed during initialization to prompt the user to enter personal information via a presence sensitive display or keyboard.

Another method for initially populating the mobile device's local database, according to an example of the disclosed technology, involves utilizing previously stored personal data and transferring the data to the mobile device's database via formatted electronic data transfer. For example, a secure server may store a user's personal information. According to an example implementation, such information may be accessed and transferred to the mobile device after logging on to an account. In one implementation, the secure server may be a remote server accessible via an Internet connection. For example, and according to one implementation, all or part of the user's previously stored personal information may be maintained in the remote server and downloaded during initialization of a new mobile device so that the user does not need to manually enter the information each time a new mobile device is purchased.

Another method for initially populating the mobile device's local database, according to an example of the disclosed technology, involves populating the database on an incremental or on-the-fly basis. For example, a user may utilize a browser to enter information into a web-based form for the first time. The entered information may be analyzed, parsed and stored in the local database for later selective retrieval. In one implementation, any personal information previously entered in this way may then be made available for selective exchange between the mobile device database, a browser, a 3rd party application, etc., provided that the entered information is associated with a proper field tag or code. In certain example implementations of the disclosed technology, standardized field tags may be generated automatically to associate field types with field values that are entered using this method. In one example implementation, the generated field types may be verified by the user for each given field value. For example, during manual entry of personal information into a web-based form, the disclosed technology may utilize HTML, XML, JavaScript, etc., to recognize tags that are associated with a given field as the data is entered into the field. In one example embodiment, if the field tags can be recognized by the profile manager, the entered field values may be properly tagged and stored in the local database. In another example embodiment, the profile manager may access and utilize a learning algorithm and/or database to assist in recognition of certain fields. For example, in the absence of a definitive standardized field type tag that can be associated with field values as the user enters personal information into a web form, the learning algorithm and/or database may be accessed to recognize that the entry of "Smith" into a web-based form field may correspond to the user's last name. Similarly, entry of "246 West Davis Street" may be recognized as a user's address, and may have an address tag associated with it. In accordance with example implementations of the disclosed technology, the profile manager may format and display the information that was entered into a web-based form, along with assigned or definitive tags so that the user may verify storing such personal information, and so that such information will be available for automatic and/or selective population of personal information into subsequent web-based forms.

According to one example implementation, as personal information is requested by a website or web form via a browser associated with the mobile device, the profile manager under control of the operating system of the mobile device may be utilized to monitor and/or detect standardized indicators that may be imbedded within the code associated with the web form. For example, web designers may utilize APIs for building their web forms so that they adhere to standard formats. In one implementation, a 3' party's website may utilize an API for embedding codes or tags in their web page to inform the profile manager as to the requested types of personal information and specific order of the fields. For example, a tag such as {FORM: FN, LN, E-MAIL} may be embedded in a webpage and read by the profile manager. Upon reading the tag, the profile manager may present a subset of the user's previously stored personal information (for example via a prompt on the mobile device) that includes a First Name, Last Name, and E-mail address, and the user of the mobile device may verify whether or not such information should be shared with the requesting website. In another example implementation, if certain personal information is requested, but has not yet been stored in the local database, the profile manager may prompt the user to manually enter such information for populating the local database. In an example implementation, the profile manager may also verify whether or not such information should be shared with the requesting entity.

According to an example implementation of the disclosed technology, the request for user information may be initiated by a user's interaction with the device. In other words, user may initiate the process of populating a form or sharing information by certain interactions, for example, by pressing a button or double tapping an icon. In other certain example implementations, the request for user information may be initiated by signals or requests from a 3rd-party website, a web application, and/or a locally installed application.

As disclosed herein, certain implementation may work in conjunction with an auto fill feature that is associated with certain browsers. Auto fill can sometimes alleviate part of the inconvenience of manually filling in web forms, but certain implementations of the disclosed technology can provide more accurate, flexible, robust, and secure methods of populating web forms, at least in part, because the personal information is stored in a database under the control of the operating system, and the user can select and verify the level of sensitive information that should be shared. Accordingly, certain implementations of the disclosed technology may work with or without the auto fill. In other implementations, an auto fill feature may be utilized and enhanced by certain implementations of the disclosed technology.

Some implementations of the disclosed technology will be described more fully hereinafter with reference to the accompanying drawings. This disclosed technology may, however, be embodied in many different forms and should not be construed as limited to the implementations set forth herein.

FIG. 1 illustrates a mobile device 102, according to an example implementation of the disclosed technology. According to one example implementation, the mobile device 102 may include a memory 104, one or more processors 106, and one or more input/output interfaces 108. For example, the one or more input/output interfaces 108 may be in communication with a display, presence or proximity sensitive interface, a network connection, a cellular connection, etc. In an example implementation, the one or more processors 106 may be configured to communicate with the memory 104. In an example implementation, the memory 106 may be configured to include an operating system 110, which may include a personal profile database 112. The operating system 112 may include a profile manager 114 for controlling information stored in a profile database 112 and for controlling the sharing or transfer of the information stored in the profile database 112. In accordance with an example implementation, the operating system may be in communication with additional modules that may be stored in memory 104, including but not limited to a web browser 116, mobile applications 118, and the like. According to example implementations of the disclosed technology, the profile manager 114, under control of the operating system 110 may provide extra security for the information in the profile database 112 so that, for example, the web browser 116 may not directly access the information in the profile database 112. Access to the information in the profile database 112 may be controlled by the profile manager 114.

In accordance with certain implementations of the disclosed technology, the mobile device 102 may include communications channels linking the profile manager 114 to the profile database 112. In example implementation, the mobile device 102 may also include communications channels linking the profile manager 114 connection to the 3rd party applications and/or web pages on browser. In certain implementations, the memory 104 may include (1) a module to generate XML or structured data from the profile database 112; (2) a module to detect the user's intention for the transfer of personal information; (3) an interpretation module to associate the 3rd party applications and/or web pages on a browser for receiving and using the XML or structured data from the profile manager 114. In one implementation, 3rd party web pages running on a browser may utilize an interpretation module that may be implemented and deployed using JavaScript standard Web technology. In accordance with certain example implementations, multiple user profiles may be prepared in advance, having different level of user information and a module to detect which profile the user chooses for submission to a requesting entity. According to an example implementation, in the case of 3rd party web pages running on a browser, the selected personal information may be auto filled in a web form. In another implementation, the selected personal information may be directly sent to the requesting remote server, according to the JavaScript implementation. In accordance with an example implementation, certain personal information that is stored locally may be shared with a requesting entity.

In one example implementation, certain information may be selected for sharing with the requesting entity, but the selected information may not include matching information for all the fields that are requested by the requesting entity. In this situation, and according to an example implementation, any of the requesting entity's fields that remain unpopulated after the sharing may be highlighted for manual entry by the user. According to certain example implementations, JavaScript, for example, may be utilized for determining which fields are unpopulated in the requesting entity's form, and appropriate field highlights or alerts may be generated to prompt the user to enter the requested information. In another situation, the selected information may include extra fields that were not requested in the requesting entity's form. In this situation, and according to certain example implementations, the non-matching information may be truncated based on the requesting entity fields, and any excess information may not be shared.

Figure 2:
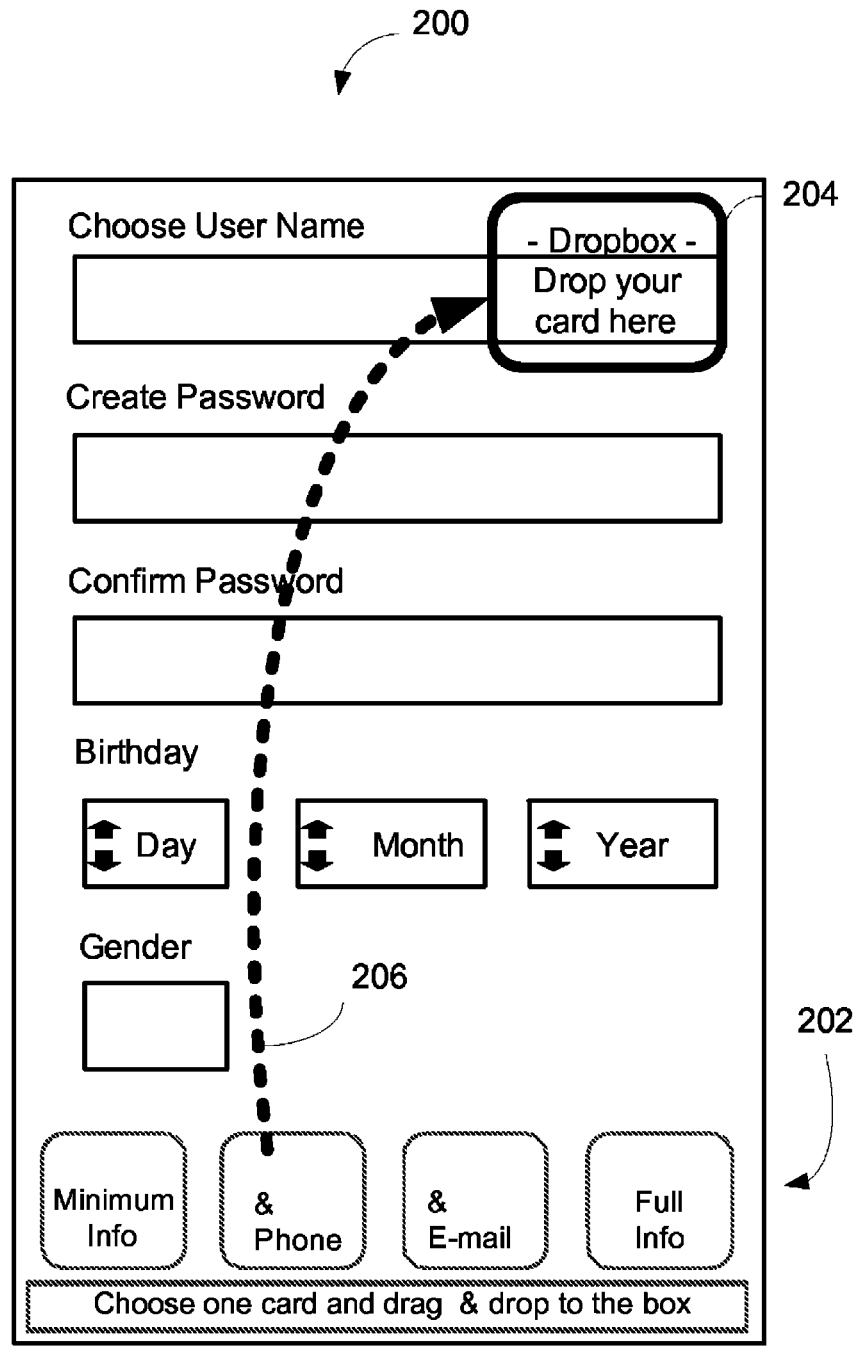
FIG. 2 is an illustrative screen image 200 presented on a display, with a prompt for selecting and sharing a subset of personal information, according to an example implementation.

FIG. 2 depicts an illustrative screen image 200 for presentation on a display to prompt 204 a user for selecting and sharing 206 a subset 202 of personal information, according to an example implementation. According to an example implementation, the fields in the screen image 200 may be derived from, or otherwise presented from a requesting entity, such as a web form, third party application, remote server, etc. In one implementation, the user may select an appropriate subset 202 of personal information for sharing with the requesting entity by dragging an icon, for example, representing a particular subset 202 of the personal information to particular area of the screen. Other methods of selecting the particular subset 202 of the personal information may be utilized without departing from the scope of the disclosed technology. For example, a user may signify selection of a particular subset 202 for sharing by pressing a key, making a gesture, swiping, etc.

According to an example implementation, if the information contained in the selected subset 202 does not exactly match with the requested fields, the profile manager (for example, profile manager 114, FIG. 1) may highlight empty (or conflicting) fields for manual entry (or correction). In another example implementation, the profile manager may recommend, via a prompt or some other signal to the device display, a particular subset 202 of the personal information that may be the closest match to the requested fields. According to an implementation of the disclosed technology, the user may review the populated fields and make a final determination regarding the sharing of the automatically populated information, make any changes, and/or delete information in any of the fields before submitting the form.

As previously discussed, any new information manually populated in the fields of the screen image 200 that have not been previously entered into the profile database (for example, profile database 112 in FIG. 1) under the control of the profile manager (for example, profile manager 114 in FIG. 1) may be entered and saved into the profile database incrementally or on-the-fly.

Various implementations of the communication systems and methods herein may be embodied in non-transitory computer readable media for execution by a processor. An example implementation may be used in an application of a mobile computing device, such as a smartphone or tablet, but other computing devices may also be used. For example, mobile computing devices can include portable computers, tablet PCs, Internet tablets, PDAs, ultra mobile PCs (UMPCs) and smartphones.

Figure 3:
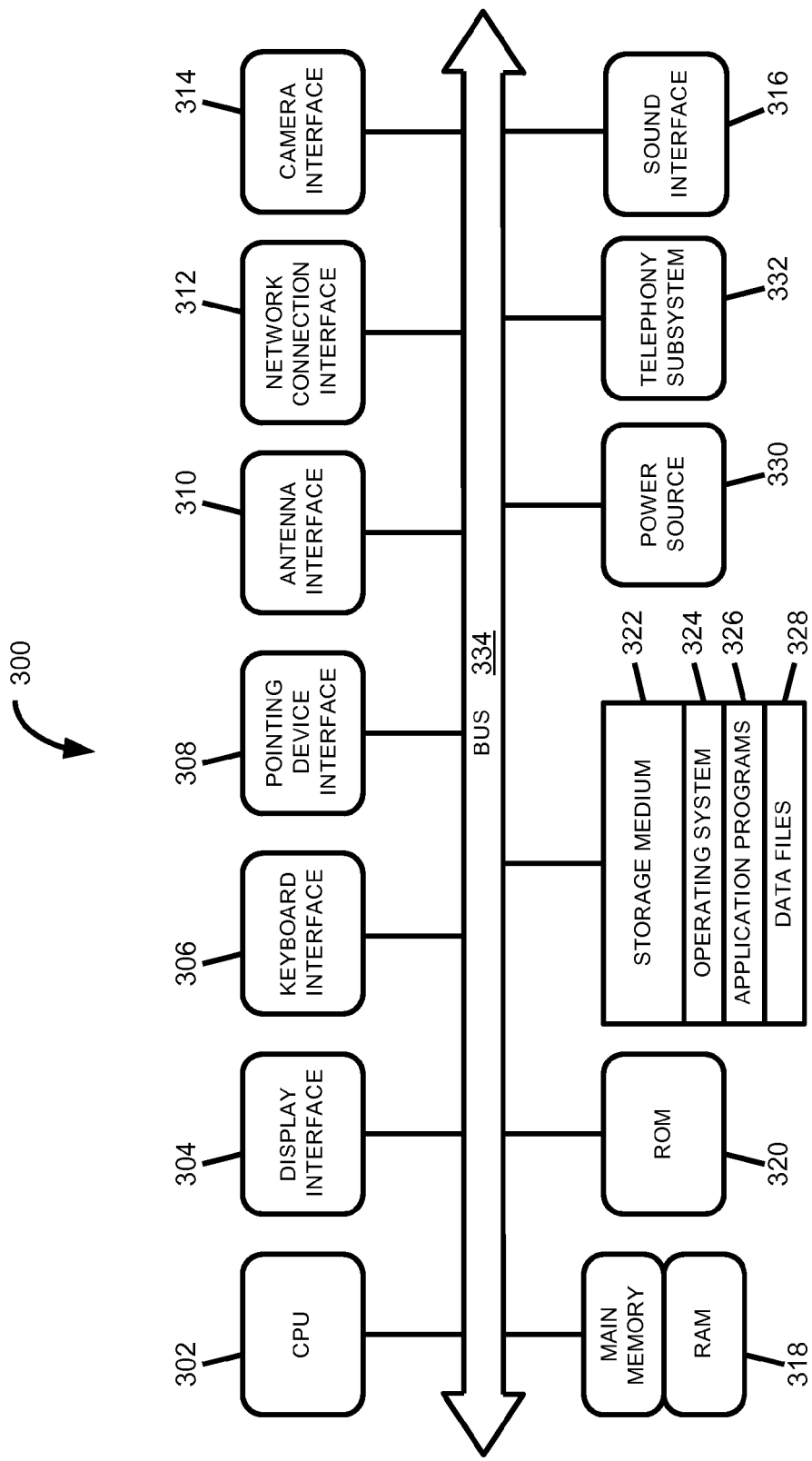
FIG. 3 is a block diagram of an illustrative system 300, according to an example implementation.

FIG. 3 illustrates schematic diagram of internal architecture of an example mobile computing device 300. It will be understood that the architecture illustrated in FIG. 3 is provided for example purposes only and does not limit the scope of the various implementations of the communication systems and methods. Certain aspects of FIG. 3 may be embodied in the mobile device (for example, the mobile device 102 as shown in FIG. 1). Various implementations of the disclosed methods herein may be embodied in non-transitory computer readable media for execution by a processor. An example implementation may be used in an application of a mobile computing device, such as a smartphone or tablet, but other computing devices may also be used.

The architecture 300 of FIG. 3 includes a central processing unit (CPU) 302, where computer instructions are processed; a display interface 304 that acts as a communication interface and provides functions for rendering video, graphics, images, and texts on the display; a keyboard interface 306 that provides a communication interface to a keyboard; and a pointing device interface 308 that provides a communication interface to a pointing device or presence sensitive display. Example implementations of the architecture 300 may include an antenna interface 310 that provides a communication interface to an antenna; a network connection interface 312 that provides a communication interface to a network. In certain implementations, a camera interface 314 is provided that acts as a communication interface and provides functions for capturing digital images from a camera. In certain implementations, a sound interface 316 is provided as a communication interface for converting sound into electrical signals using a microphone and for converting electrical signals into sound using a speaker. According to example implementations, a random access memory (RAM) 318 is provided, where computer instructions and data are stored in a volatile memory device for processing by the CPU 302.

According to an example implementation, the architecture 300 includes a read-only memory (ROM) 320 where invariant low-level systems code or data for basic system functions such as basic input and output (I/O), startup, or reception of keystrokes from a keyboard are stored in a non-volatile memory device. According to an example implementation, the architecture 300 includes a storage medium 322 or other suitable type of memory (e.g. such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives), where the files include an operating system 324, application programs 326 (including, for example, a web browser application, a widget or gadget engine, and or other applications, as necessary) and data files 328 may be stored. According to an example implementation, the architecture 300 includes a power source 330 that provides an appropriate alternating current (AC) or direct current (DC) to power components. According to an example implementation, the architecture 300 includes and a telephony subsystem 332 that allows the device 300 to transmit and receive sound over a telephone network. The constituent devices and the CPU 302 communicate with each other over a bus 334.

In accordance with example implementations, the CPU 302 has appropriate structure to be a computer processor. In one arrangement, the computer CPU 302 is more than one processing unit. The RAM 318 interfaces with the computer bus 334 to provide quick RAM storage to the CPU 302 during the execution of software programs such as the operating system application programs, and device drivers. More specifically, the CPU 302 loads computer-executable process steps from the storage medium 322 or other media into a field of the RAM 318 in order to execute software programs. Data is stored in the RAM 318, where the data may be accessed by the computer CPU 302 during execution. In one example configuration, the device 300 includes at least 128 MB of RAM, and 256 MB of flash memory.

The storage medium 322 itself may include a number of physical drive units, such as a redundant array of independent disks (RAID), a floppy disk drive, a flash memory, a USB flash drive, an external hard disk drive, thumb drive, pen drive, key drive, a High-Density Digital Versatile Disc (HD-DVD) optical disc drive, an internal hard disk drive, a Blu-Ray optical disc drive, or a Holographic Digital Data Storage (HDDS) optical disc drive, an external mini-dual in-line memory module (DIMM) synchronous dynamic random access memory (SDRAM), or an external micro-DIMM SDRAM. Such computer readable storage media allow the device 300 to access computer-executable process steps, application programs and the like, stored on removable and non-removable memory media, to off-load data from the device 300 or to upload data onto the device 300. A computer program product, such as one utilizing a communication system may be tangibly embodied in storage medium 322, which may comprise a machine-readable storage medium.

Figure 4:
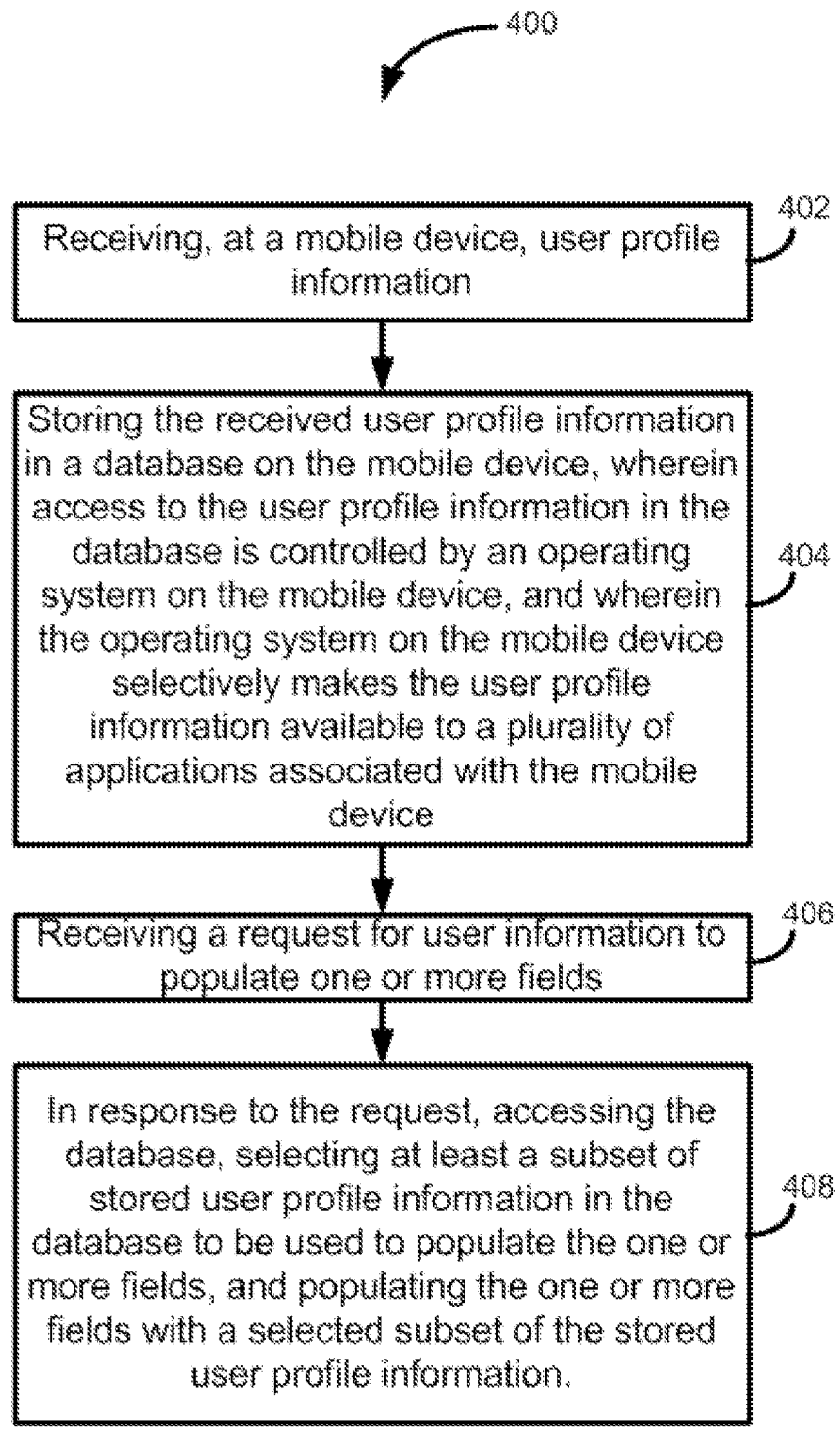
FIG. 4 is a flow diagram of a method according to an example implementation.

An example method 400 for securely storing personal information and securely controlling the transfer or sharing of the personal information will now be described with reference to the flowchart of FIG. 4. The method 400 starts in block 402, and according to an example implementation includes receiving, at a mobile device, user profile information. In block 404, the method 400 includes storing the received user profile information in a database on the mobile device, wherein access to the user profile information in the database is controlled by an operating system on the mobile device, and wherein the operating system on the mobile device selectively makes the user profile information available to a plurality of applications associated with the mobile device. In block 406, the method 400 includes receiving a request for user information to populate one or more fields. In block 408, the method 400 includes, in response to the request, accessing the database, selecting at least a subset of stored user profile information in the database to be used to populate the one or more fields, and populating the one or more fields with a selected subset of the stored user profile information.

In an example implementation, populating the one or more fields with at least a subset of the stored in formation in response to the request may include providing a prompt for a user to allow the populating and/or to verify the populated information.

Further example implementations of the method may include receiving the user profile information via a presence sensitive display. Other implementations include receiving the user profile information via electronically formatted data. According to certain example implementations, storing the received user profile information can include parsing the received user profile information according to one or more predefined fields. In certain example implementations, one or more subsets of the stored user profile information may be associated with one or more corresponding prompts, and the one or more prompts may be displayed for selection of the one or more subsets of the stored user profile information in response to receiving the request for user information. In one implementation, populating the one or more fields with the selected subset of the stored user profile information may be performed by receiving input via a presence sensitive display, keyboard, or other human-machine interface.

According to an example implementation, certain technical effects may be provided, such as creating certain systems and methods that provide enhanced security and control of personal information. An example implementation of the disclosed technology can provide the further technical effects of providing systems and methods that simplify entering personal information into web forms.

In an example implementation of the disclosed technology, the mobile device 102 and/or the system architecture 300 may include any number of hardware and/or software applications that are executed to facilitate any of the operations. In example implementations, one or more I/O interfaces may facilitate communication between the mobile device 102 and/or the system architecture 300 and one or more input/output devices. For example, a universal serial bus port, a serial port, a disk drive, a CD-ROM drive, and/or one or more user interface devices, such as a display, keyboard, keypad, mouse, control panel, presence sensitive display, microphone, etc., may facilitate user interaction with the mobile device 102 and/or the system architecture 300. The one or more I/O interfaces may be utilized to receive or collect data and/or user instructions from a wide variety of input devices. Received data may be processed by one or more computer processors as desired in various implementations of the disclosed technology and/or stored in one or more memory devices.

One or more network interfaces may facilitate connection of the mobile device 102 and/or the system architecture 300 inputs and outputs to one or more suitable networks and/or connections; for example, the connections that facilitate communication with any number of sensors associated with the system. The one or more network interfaces may further facilitate connection to one or more suitable networks; for example, a local area network, a wide area network, the Internet, a cellular network, a radio frequency network, a Bluetooth enabled network, a Wi-Fi enabled network, a satellite-based network any wired network, any wireless network, near field communication, etc., for communication with external devices and/or systems. As desired, implementations of the disclosed technology may include the mobile device 102 and/or the system architecture 300 with more or less of the components illustrated in FIG. 1 or FIG. 3.

Certain implementations of the disclosed technology are described above with reference to block and flow diagrams of systems and methods and/or computer program products according to example implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, implementations of the disclosed technology may provide for a computer program product, comprising a computer-usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Certain implementations of the disclosed technology are described above with reference to mobile devices. Those skilled in the art recognize that there are several categories of mobile devices, generally known as portable computing devices that can run on batteries but are not usually classified as laptops. For example, mobile devices can include, but are not limited to portable computers, tablet PCs, Internet tablets, PDAs, ultra mobile PCs (UMPCs) and smartphones.

While certain implementations of the disclosed technology have been described in connection with what is presently considered to be the most practical and various implementations, it is to be understood that the disclosed technology is not to be limited to the disclosed implementations, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain implementations of the disclosed technology, including the best mode, and also to enable any person skilled in the art to practice certain implementations of the disclosed technology, including making and using any devices or systems and performing any incorporated methods. The patentable scope of certain implementations of the disclosed technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A computer-implemented method comprising:
   receiving, at a mobile device, user profile information, the user profile information comprising personal information about a user for storage on the mobile device;
   storing the received user profile information in a database on the mobile device, wherein access to the user profile information in the database is controlled at a level of an operating system on the mobile device, and wherein the operating system on the mobile device selectively makes the user profile information available to a plurality of applications associated with the mobile device;
   receiving a request for user information to populate one or more fields on the mobile device; and
   in response to the request:
      accessing the database;
      associating one or more matching subsets of the stored user profile information with one or more corresponding prompts, and displaying at least one of the one or more prompts for selection of the one or more matching subsets of the stored user profile information in response to receiving the request for user information, wherein a matching subset of the stored user profile information comprises at least one field that matches the request for user information to populate one or more fields on the mobile device;
      selecting at least a subset of stored user profile information in the database on the mobile device to be used to populate the one or more fields; and
      populating the one or more fields with a selected subset of the stored user profile information.

2. The method of claim 1, wherein receiving the user profile information comprises receiving data that is input, by one or more gestures, into a presence sensitive display on the mobile device.

3. The method of claim 1, wherein receiving the user profile information comprises electronically receiving formatted data.

4. The method of claim 1, wherein storing the received user profile information comprises parsing the received user profile information according to one or more predefined fields.

5. The method of claim 1, further comprising associating one or more closest match subsets of the stored user profile information with one or more corresponding prompts, and displaying at least one of the one or more prompts for selection of the one or more closest match subsets of the stored user profile information in response to receiving the request for user information.

6. The method of claim 5, further comprising receiving input via a presence sensitive display to select and populate the one or more fields with the selected subset of the stored user profile information, and populating the one or more fields with the selected subset of the stored user profile information.

7. A system comprising:
   a presence sensitive display;
   one or more processors in communication with the presence sensitive display; and
   at least one memory comprising an operating system and a database, the memory in communication with the one or more processors and configured for storing data and instructions which, when executed by the at least one processor under control of the operating system, enable the system to:
      receive, at a mobile device, user profile information, the user profile information comprising personal information about a user for storage on the mobile device;
      store the received user profile information in a database, wherein access to the user profile information in the database is controlled at a level of an operating system, and wherein the operating system selectively makes the user profile information available to a plurality of applications associated with the system;
      receive a request for user information to populate one or more fields on the mobile device; and
      in response to the request:
         access the database;
         associate one or more matching subsets of the stored user profile information with one or more corresponding prompts, and displaying at least one of the one or more prompts for selection of the one or more matching subsets of the stored user profile information in response to receiving the request for user information, wherein a matching subset of the stored user profile information comprises at least one field that matches the request for user information to populate one or more fields on the mobile device;
         select at least a subset of stored user profile information in the database on the mobile device to be used to populate the one or more fields; and
         populate the one or more fields with a selected subset of the stored user profile information.

8. The system of claim 7, wherein the one or more processors, under control of the operating system, further enable the system to receive the user profile information via the presence sensitive display.

9. The system of claim 7, wherein the user profile information comprises formatted data.

10. The system of claim 7, wherein the user profile information is stored, at least in part, by parsing the received user profile information according to one or more predefined fields.

11. The system of claim 7, wherein the instructions, when executed by the at least one processor under control of the operating system, further cause the system to associate one or more closest match subsets of the stored user profile information with corresponding one or more prompts, and further display at least one of the one or more prompt for selection of the one or more closest match subsets of the stored user profile information in response to receiving the request for user information.

12. The system of claim 11, wherein the instructions, when executed by the at least one processor under control of the operating system, further cause the system to receive input via a presence sensitive display to select and populate the one or more fields with the selected subset of the stored user profile information.

13. A computer-readable medium that stores instructions which, when executed by at least one processor in a system, cause the system to perform a method comprising:
  receiving, at a mobile device, user profile information, the user profile information comprising personal information about a user for storage on the mobile device;
  storing the received user profile information in a database on the system, wherein access to the user profile information in the database is controlled at a level of an operating system on the system, and wherein the operating system on the system selectively makes the user profile information available to a plurality of applications associated with the system;
  receiving a request for user information to populate one or more fields on the mobile device; and
  in response to the request:
    accessing the database;
    associating one or more matching subsets of the stored user profile information with one or more corresponding prompts, and displaying at least one of the one or more prompts for selection of the one or more matching subsets of the stored user profile information in response to receiving the request for user information, wherein a matching subset of the stored user profile information comprises at least one field that matches the request for user information to populate one or more fields on the mobile device;
    selecting at least a subset of stored user profile information in the database on the mobile device to be used to populate the one or more fields; and
    populating the one or more fields with a selected subset of the stored user profile information.

14. The computer-readable medium of claim 13, wherein receiving the user profile information comprises receiving data that is input, by one or more gestures, into the system.

15. The computer-readable medium of claim 13, wherein receiving the user profile information comprises electronically receiving formatted data.

16. The computer-readable medium of claim 13, wherein storing the received user profile information comprises parsing the received user profile information according to one or more predefined fields.

17. The computer-readable medium of claim 13, further comprising associating one or more closest match subsets of the stored user profile information with corresponding one or more prompts, and displaying at least one of the one or more prompt for selection of the one or more closest match subsets of the stored user profile information in response to receiving the request for user information.

18. The computer-readable medium of claim 17, further comprising receiving input to select and populate the one or more fields with the selected subset of the stored user profile information.

19. The computer-readable medium of claim 13, wherein the receiving the request for the user information comprises electronically receiving formatted data, wherein the formatted data comprises a description of requested fields.

20. The computer-readable medium of claim 13, further comprising populating one or more fields with at least a subset of the stored user profile information in response to a touch gesture input.

\* \* \* \* \*